United States Patent
Ullah

(10) Patent No.: US 8,903,243 B2
(45) Date of Patent: Dec. 2, 2014

(54) OILFIELD OPTICAL DATA TRANSMISSION ASSEMBLY JOINT

(75) Inventor: Kalim Ullah, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 111 days.

(21) Appl. No.: 13/395,371

(22) PCT Filed: Sep. 17, 2010

(86) PCT No.: PCT/US2010/049220
§ 371 (c)(1), (2), (4) Date: May 9, 2012

(87) PCT Pub. No.: WO2011/035089
PCT Pub. Date: Mar. 24, 2011

(65) Prior Publication Data
US 2012/0213525 A1   Aug. 23, 2012

Related U.S. Application Data

(60) Provisional application No. 61/243,317, filed on Sep. 17, 2009.

(51) Int. Cl.
*H04B 10/00* (2013.01)
*G02B 6/36* (2006.01)

(52) U.S. Cl.
CPC .................................. *G02B 6/3604* (2013.01)
USPC ........................................................ 398/114

(58) Field of Classification Search
USPC .................................................. 398/172, 114
See application file for complete search history.

(56) References Cited

U.S. PATENT DOCUMENTS

| | | | |
|---|---|---|---|
| 4,175,230 A * | 11/1979 | Richards et al. | 398/114 |
| 4,190,318 A | 2/1980 | Upton | |
| 4,277,134 A | 7/1981 | Upton | |
| 4,389,645 A | 6/1983 | Wharton | |
| 4,842,355 A | 6/1989 | Gold et al. | |
| 5,435,395 A | 7/1995 | Connell | |
| 5,493,626 A | 2/1996 | Schultz et al. | |
| 5,588,077 A | 12/1996 | Woodside | |
| 5,850,879 A | 12/1998 | Smith | |
| 5,898,517 A | 4/1999 | Weis | |
| 6,072,567 A | 6/2000 | Sapack | |
| 6,353,693 B1 * | 3/2002 | Kano et al. | 385/26 |
| 6,520,264 B1 | 2/2003 | MacKenzie et al. | |
| 6,557,249 B1 | 5/2003 | Pruett et al. | |
| 7,140,435 B2 | 11/2006 | Defretin et al. | |

(Continued)

FOREIGN PATENT DOCUMENTS

| | | |
|---|---|---|
| GB | 2392462 A | 3/2004 |
| GB | 2404994 A | 2/2005 |

(Continued)

*Primary Examiner* — Leslie Pascal
(74) *Attorney, Agent, or Firm* — Trevor Grove

(57) ABSTRACT

A joint for disposing between a rotatable drum and stationary surface equipment. The joint serves as a channel through which optical data from a well access line may be routed through the rotating drum and to the stationary equipment for processing. The optical data may be routed in a manner that allows for multi-fiber transmissions with one fiber dedicated to uphole transmissions and another dedicated to downhole transmissions. This is achieved through embodiments of the joint in spite of the separate optical channels involved sharing the same central axis to allow for data transfer between moving and stationary joint components.

18 Claims, 5 Drawing Sheets

(56) References Cited

U.S. PATENT DOCUMENTS

| | | |
|---|---|---|
| 7,900,699 B2 | 3/2011 | Ramos et al. |
| 7,946,341 B2 | 5/2011 | Hartog et al. |
| 2002/0007945 A1 | 1/2002 | Neuroth et al. |
| 2005/0034857 A1 | 2/2005 | Defretin et al. |
| 2005/0236161 A1 | 10/2005 | Gay et al. |
| 2005/0263281 A1 | 12/2005 | Lovell et al. |
| 2006/0045442 A1 | 3/2006 | Varkey et al. |
| 2006/0260739 A1 | 11/2006 | Varkey |
| 2007/0227741 A1 | 10/2007 | Lovell et al. |
| 2008/0118209 A1 | 5/2008 | Varkey et al. |
| 2008/0131063 A1 | 6/2008 | Rubinstein et al. |
| 2008/0181555 A1 | 7/2008 | Head |
| 2008/0302542 A1 | 12/2008 | Pessin et al. |
| 2009/0230295 A1 | 9/2009 | Waring et al. |

FOREIGN PATENT DOCUMENTS

| | | |
|---|---|---|
| GB | 2409871 A | 7/2005 |
| WO | 2006059157 A1 | 6/2006 |
| WO | 2006059158 A1 | 6/2006 |
| WO | 2006097772 A1 | 9/2006 |
| WO | 2006131871 A2 | 12/2006 |

* cited by examiner

OILFIELD OPTICAL DATA TRANSMISSION ASSEMBLY JOINT

CROSS-REFERENCE TO RELATED APPLICATIONS

This application is a 371 of international Application No. PCT/US10/49220, filed Sep. 17, 2010, which claims the benefit of U.S. Provisional Patent Application Ser. No. 61/243,317, filed Sep. 17, 2009. Each of the aforementioned related patent applications is herein incorporated by reference.

FIELD

Embodiments described relate to the use of fiber optic transmissions obtained through a wireline cable, slickline or other well access line having a fiber optic line incorporated therein. More specifically, the embodiments described relate to the use of a transmission assembly joint at the junction of rotating and stationary surface equipment. The rotating equipment may be surface equipment employed for positioning a line and tool string at various downhole depths in the well during oilfield logging and/or well intervention or other data gathering operations. The more stationary equipment may include a data recorder and processor for storage and real time processing of obtained data from light signal transmission thru optical fibers and also from optics based sensors embedded in downhole tools.

BACKGROUND

In recognition of the significant expenses associated with hydrocarbon wells, added emphasis has been placed on well logging, profiling and monitoring of conditions throughout the life of a well. As a result, the detecting, monitoring and intervention of well conditions over the years has become a more sophisticated and critical part of managing well operations.

Initial gathering of information relative to well and surrounding formation conditions may be obtained by way of a logging or monitoring application. That is, equipment at the surface of an oilfield adjacent to the well may be used to deploy a logging tool with various sensors embedded within it in the well. Often, an electrically conductive logging cable is used to deliver the logging tool into the well. The logging cable may include a variety of power and communicative lines incorporated into the cable may be of relatively substantial weight, strength, and profile. Thus, the cable may be well suited for delivery of the logging tool to significant well depths without undue concern over the accommodated load of the tool or perhaps the increasing load of the cable itself.

In order to reduce the overall weight of the cable, communicative functionality may be provided to the cable by incorporation of a single or multi-channel fiber optic line. Indeed, given the high speed data transmission achievable through conventional fiber optic line, its incorporation into the cable theoretically provides substantially high data bandwidth rate for real-time communicative capacity to operations employing the cable.

Unfortunately, however, the above described cable is managed at the oilfield surface through a drum, winch or other conventional winding device. That is, at surface, the cable is wound and unwound from a rotating drum in order to position a tool such as the noted logging tool in the well. As a result, light transmissible data that is communicated over the fiber optic line from the tool is typically only collected at a data storage device associated with the rotatable drum or other rotating management tool. Once such data is collected, the drum may be stopped and the data transferred from the data storage device to a stationary processor for analysis. This initial stopping of the drum rotation is due to the fact that the physical challenges of collecting light transmitted data from a moving drum device are viewed as cumbersome and impractical. Unlike electrical communications, where a rotating disk and contact slip-ring configuration would allow for transmission from moving to non-moving structures, such is not available in the case of oilfield light transmissions, particularly of the multi-channel variety. above, it's high speed, real-time benefits generally go unrealized. That is, readings are taken by a downhole sensor of the logging tool. These readings are transmitted uphole at near real-time speeds only to be stored at the storage device for a period of time. Rotation of the drum is eventually halted, and, finally, data from the now still device is downloaded for analysis. Thus, as a practical matter, no high speed real-time communication benefits are realized.

It has been suggested that data may be acquired in a manner that obviates physical challenges associated with the combination of light transmissions and a rotating drum. For example, in theory, the light data may be collected and converted into a wireless signal at the rotating drum. Thus, wireless collection of the signal data from the drum would not require that the rotation of the drum be halted. As a result, the signal data could be immediately transmitted to a stationary processor at the oilfield surface for analysis. In this manner, the high speed nature of the fiber optic line may be taken advantage of.

Unfortunately, at the oilfield, applications such as the noted logging and intervention application, are often run in conjunction with a host of others. Many of these other applications involve the use of explosives, such as in the case of perforating a sub surface formation, a common application run in conjunction with logging. Therefore, as a matter of safety, devices prone to generate static or electro-magnetic interference are avoided. Unfortunately, this includes devices such as those employed for wireless transmissions. As a result, while fiber optic line is often utilized as a means to reduce cable weight, its real-time high-speed potential and advantages of very high volume data transmission capabilities remain largely unrealized at the oilfield.

SUMMARY includes a rotating housing that receives the optical termination of at least one optical fiber. This rotating joint is coupled to a fixed housing which includes an optical interface for communicative alignment with the optical termination.

A method of employing the joint at the oilfield is also provided. The method includes rotating a drum in order to deploy a well access line such as a wireline cable into a well. As such, a coupling of the joint which is affixed to the drum may also be rotated. However, fiber optic data may be transmitted between this coupling and a stationary housing of the joint in order to allow for real time data processing by other equipment at the oilfield surface.

BRIEF DESCRIPTION OF THE DRAWINGS

Referring now to FIG. 1, a front view of an oilfield drum 150 accommodating a well access line in the form of wireline cable 180 is depicted. Depending on the particular oilfield application, up to several thousand feet of the wireline cable 180 may be wrapped about a core 175 of the drum 150. Further, as described below, this entire length of wireline cable 180 may be equipped with fiber optic line 290 embedded or otherwise disposed within the cable 180 (see FIG. 2B). Thus, to effectively obtain fiber optic data from the wireline cable 180, the drum 150 is coupled to an embodiment of an optical data transmission assembly joint 100. In an embodiment, the well access line 180 may comprise coiled tubing having a fiber optic line, such as the fiber optic line 290, disposed or enclosed therein or thereabout, a slickline cable, or other suitable well access line.

Figure 1:
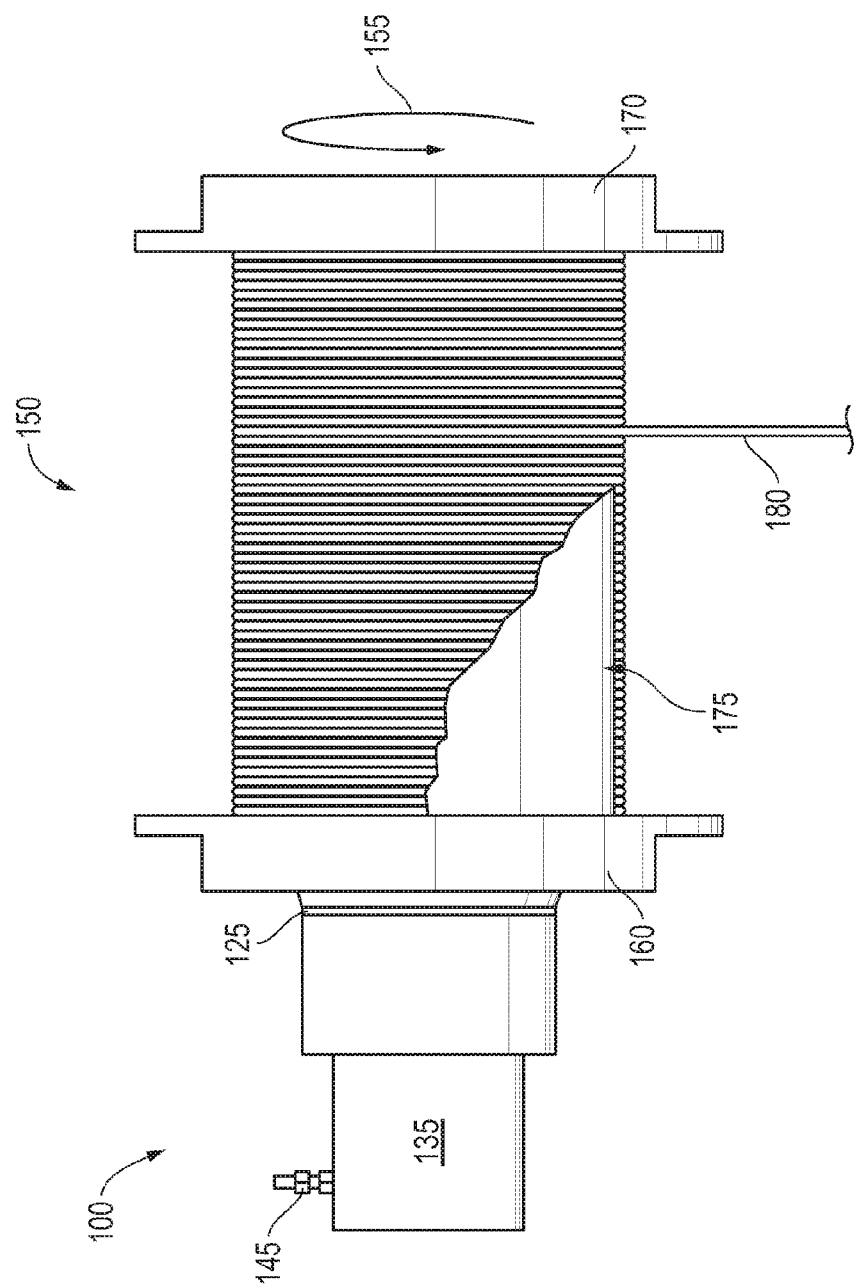
FIG. 1 is a front view of a well access line and oilfield drum employing an embodiment of an optical data transmission assembly joint.
Figure 4:
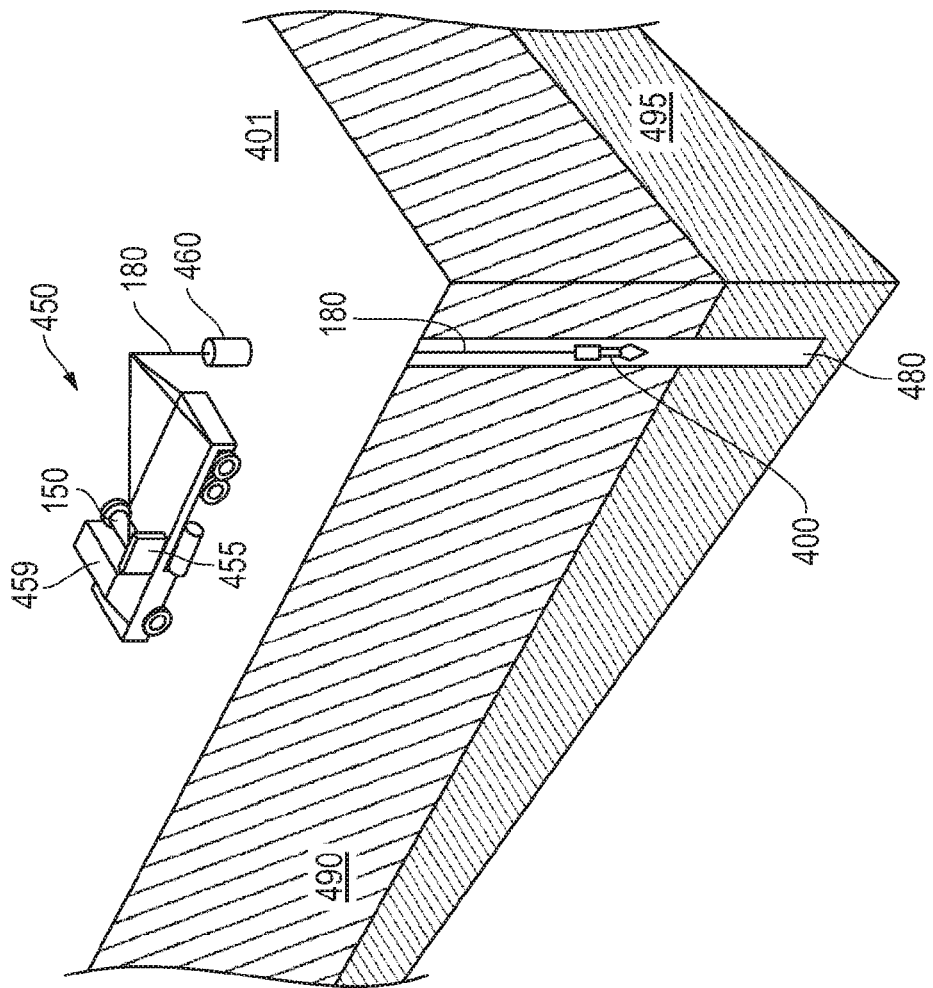
FIG. 4 depicts an overview of an oilfield where an embodiment of the optical data transmission assembly joint is put to practical use.

The noted joint 100 may be mounted to one of the side flanges 160, 170 of the drum 150 and configured to translate fiber optic data from a moving drum 150 and wireline cable 180 to a stationary output 145. The output 145 shown may be a conventional connection flange for cable leading to a control unit at the oilfield surface. application, the drum 150 may rotatably move (see arrow 155). Thus, the wireline cable 180 may be properly positioned in a well 480 for the application (see FIG. 4). Accordingly, the joint 100 is particularly configured to obtain fiber optic data from the moving wireline cable 180 and supply it to a stationary output 145 as detailed further below. With particular reference to FIG. 1, the stationary output 145 and the stationary housing 135 of the joint 100 are configured to remain stationary as the drum 150 is rotated during an application. This is achieved through use of a conventional bearing interface 125 as shown (often referred to as a (stationary) pillow block with bearing mounted inside the pillow block, as will be appreciated by those skilled in the art).

Figure 2A:
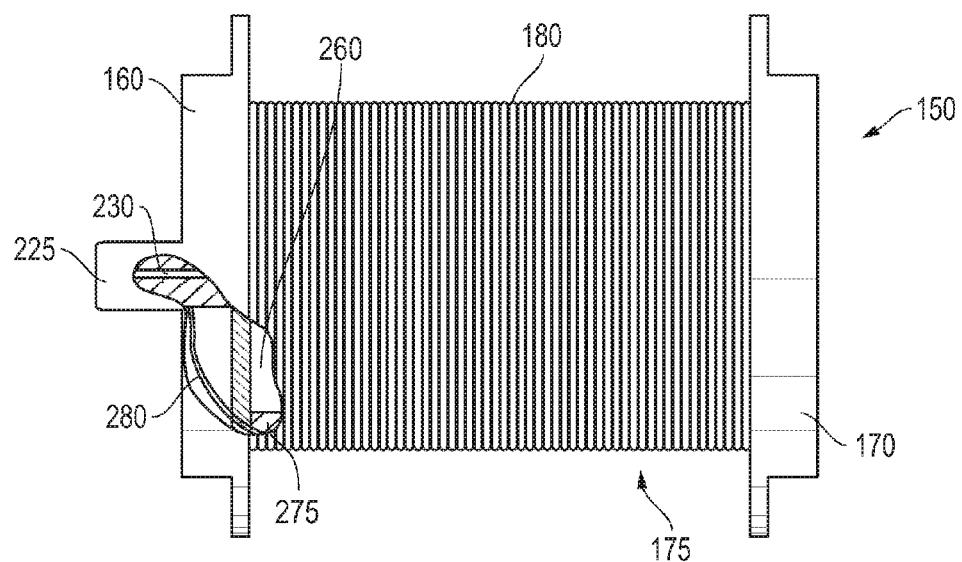
FIG. 2A is a partially sectional side view of the line and drum of FIG. 1, revealing an internal rotatable coupling of the joint.

Referring now to FIG. 2A, a partially sectional side view of the drum 150 with wireline cable 180 about its core 175 is shown. The sectional view reveals the underlying core structure 275 which interfaces a sidewall of a flange 160. Notably, a wireline extension 280 is provided which extends from a terminal end of the wireline cable 180 at the core 175. This extension 280 also traverses the sidewall into a flange space 260 at an interior of the flange 160. Indeed, this flange 160 accommodates the joint 100 of FIG. 1 to which the extension 280 is also coupled. More specifically, the extension 280 is directed to an internal coupling 225 extending from the flange 160. As detailed below, this coupling 225 in turn serves as the rotatable portion of the joint 100 of FIG. 1. The coupling 225 also includes a central channel 230 for receiving fiber optic components of the wireline cable 180 as described below.

Figure 2B:
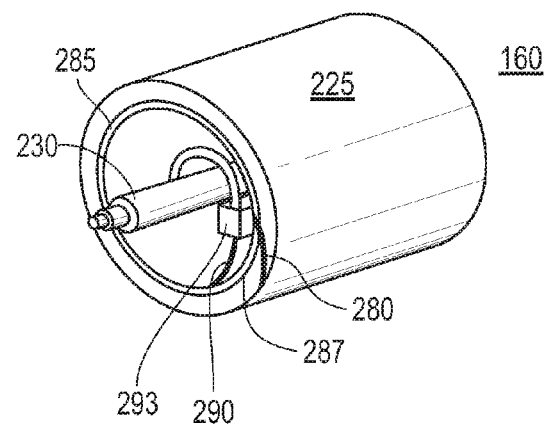
FIG. 2B is a perspective view of the rotatable coupling of FIG. 2A configured to accommodate single channel fiber optics.

Referring now to FIG. 2B, a perspective view of the rotatable coupling 225 is shown in greater detail. In particular, in this embodiment, the coupling 225 is configured to accommodate single channel fiber optics. Thus, it may be practical for the fiber optics to be 'pigtailed' or wound relative to the coupling 225 in reaching a common axis (e.g. the central channel 230) shared with stationary structure in order to installation. More specifically, as shown in FIG. 2B, the wireline extension 280 is shown reaching the coupling 225 where power and communication line components 285 are eventually split into discrete fiber optic 290 and electrical 287 lines in those embodiments of the wireline cable 180 wherein both optical fibers and electrical conductors are provided as part of the wireline cable 180. Thus, a fiber optic junction 293 is provided.

As described above, the coupling 225 is rotatable along with the flange 160 and drum 150 to which it is directly coupled. Thus, as each of the electrical 287 and fiber optic 290 lines ultimately terminate at the coupling 225, physical rotation thereof is allowed to persist. Thus, the stationary housing 135 of FIG. 1, which encompasses the coupling 225, is configured to allow for such movement while effectively transferring fiber optic and electrical data (and power) thereacross to stationary surface components.

By the same token, it may be more common that the wireline extension 280 of FIG. 2 is multi-fiber in nature. Thus, given the increased profile, a pigtail configuration for line terminations may be less practical. However, with reference now to FIG. 3A, the optical data transmission assembly joint 100 of FIG. 1 is depicted which accounts for such multi-fiber challenges. A more detailed explanation of interfacing rotatable and stationary components is also provided with reference to FIG. 3A.

Figure 3A:
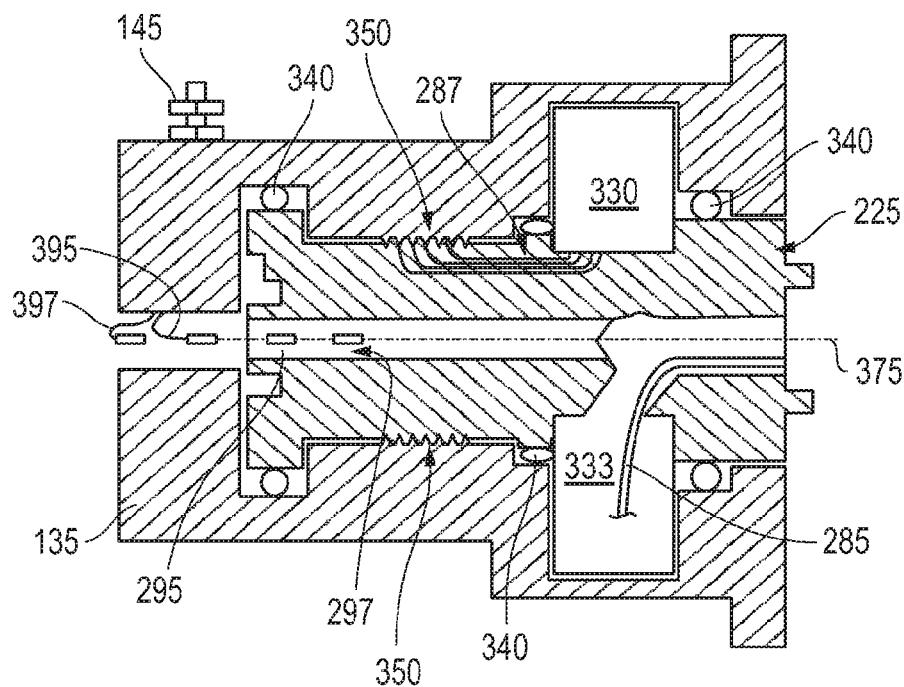
FIG. 3A is a cross-sectional side view of the optical data transmission assembly joint of FIG. 1, configured to accommodate a multi-fiber optical line.

In the cross-sectional view of FIG. 3A, the stationary housing 135 of FIG. 2A is shown with the rotatable coupling 225 of FIG. 2B disposed therein. Again, the stationary housing 135 may be physically affixed to surface equipment such as a control unit 455 described below (see FIG. 4). Thus, a preferably very high precision bearing interfacing 340 is employed to allow for the substantially friction-free rotation of the coupling 225 within the housing 135. In physical terms, this means that the measurable consequence over the course of an oilfield application (see FIGS. 1 and 2A). Nevertheless, data and/or power transfer between the rotatable coupling 225 and stationary housing 135 is achieved. So, for example, fiber optic data from the coupling 225 side of the joint 100 may be processed in real-time.

Continuing with reference to FIG. 3A, line components 285, 287, 295, 297 of the wireline cable 180 of FIG. 1 are shown terminating within the rotatable coupling 225. By the same token, in the embodiment shown, a stationary output 145 is affixed to the housing 135 through which data may be directed to the noted control unit 455 of FIG. 4. Thus, between these terminations and the output 145 a bit more detail is revealed upon closer examination of FIG. 3A.

FIG. 3A reveals the power and communication line components 285 extending into the coupling 225 from the wireline extension 280 of FIG. 2A. More specifically, these bundled line components 285 are directed off-axis toward a chamber 333 or other appropriate space at the side of the coupling 225. Thus, a central axis 375 aligned with the channel 230 of FIG. 2A remains more open and accommodating of the fiber optics therein as detailed further below.

Continuing with reference to FIG. 3A, the bundled line components 285 eventually split off into the individual optical fibers 295, 297 and electrical lines 287. As to the electrical lines 287 more specifically, an electrical junction 330 is incorporated into the coupling 225, from which separate lines may be routed to an electrical slip-ring interface 350. This interface 350 may be a conventional electrical slip-ring where individual electrical lines 287 terminate at electrically conductive extensions which maintain rotational contact with electrically conductive discs at the inner surface of the housing 135. As such, electrical communication and/or power may take place between the rotatable coupling 225 and the stationary housing 135. between rotatable 225 and stationary 135 portions of the joint 100, an alternate form of interface may be provided to allow for fiber optic communication between such portions 225, 135. Namely, as depicted, optical fibers 295, 297 which terminate at the rotatable coupling 225 are configured for communication with optical fibers 395, 397 which terminate (or originate) at the stationary housing 135. This is achieved in part by each of the noted fibers 295, 297, 395, 397 terminating along the central axis 375 which is common to both the rotatable 225 and stationary 135 portions of the joint 100. So, for example, the terminal end of an optical fiber 295 terminating at the rotatable coupling 225 may be axially aligned with the terminal end of an optical fiber 395 terminating at the stationary housing 135. Thus, even though the coupling 225 may rotate, the noted optical fiber 395 of the stationary housing 135 may communicate with the resultant axially rotating adjacent fiber 295.

Of course, the above noted individual fibers 295, 395 may represent a single fiber optic channel. For example, in the embodiment shown, the described fibers 295, 395 may be dedicated to uphole fiber optic transmissions. Thus, dedicated downhole optical fibers 297, 397 for example, to direct downhole operations, may also be provided. However, unlike the above-described uphole communication fibers 295, 395, the downhole communication fibers 297, 397 may not be positioned immediately adjacent one another at the axis 375. Indeed, the terminations of the uphole fibers 295, 395 may rest at the axis 375 therebetween, appearing to block direct communication between the downhole fibers 297, 397. Therefore, as detailed below with respect to FIG. 3B, added measures may be taken to ensure communication between the rotatable termination point of one of the downhole fibers 297 and that of the stationary downhole fiber 397. optical interface between the optical fibers 295, 297 terminating in the rotatable coupling and those fibers 395, 397 terminating at the stationary housing 135. In this representation, a manner by which separate optical channels may be effectively employed over the same central axis 375 of the joint 100 is revealed (see FIG. 3A). More specifically, the interior or uphole interfacing 310 between the dedicated uphole fibers 295, 395, is located between the dedicated downhole fibers 297, 397. That is, the uphole interfacing 310 takes place within the exterior or downhole interfacing 377. Nevertheless, as detailed below, the uphole interfacing 310 fails to occlude or prohibit the downhole interfacing 377.

In allowing effective downhole interfacing 377, the uphole interfacing 310 is configured with terminal ends of its fibers 295, 395 mounted very close to one another, preferably within a few times the fiber diameter. Thus, with one fiber 295 being rotatable and the other fiber 395 stationary, a substantially tight and precise alignment between the coupling 225 and housing 135 is maintained. Additionally, in order to reduce interference with downhole interfacing 377, mounts for the terminal ends of the uphole fibers 295, 395 may be of a reduced profile.

The above-described configuration of the uphole interfacing 310 now allows for downhole interfacing 377 to proceed thereover. This is achieved through use of lens mechanisms 305, 307 which may be employed to direct the interfacing 377 in a manner which minimizes the presence of the intervening uphole interfacing 310. In fact, these mechanisms and may even reduce the degree of precision required in axial alignment of the terminal ends of the downhole fibers 297, 397.

Figure 3B:
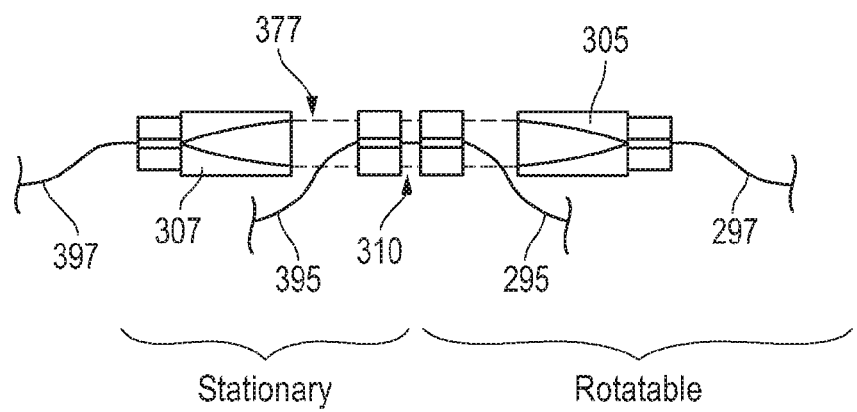
FIG. 3B is a schematic representation of an embodiment of an optical interface of multiple optical channels between the stationary housing and rotatable extension of FIG. 3A.

In the embodiment of FIG. 3B, downhole light data may be transmitted from the stationary fiber 397 to the rotatable fiber 297 over the depicted interface 377. The terminal end of the stationary fiber 397 is coupled to a stationary lens mechanism 307 certain amount of this data may be masked by the terminal ends of the uphole fibers 295, 395 and mounts, such interference is reduced by the minimal profile of the fibers 295, 395 and the transparent nature of the mounts as described above. Ultimately, the rotatable lens mechanism 305 is configured to capture the transmitted light data from the interface 377, focusing it toward the adjacently coupled rotatable fiber 297.

It is worth noting that in theory there might be a potential for interference in the form of the downhole light data at the uphole interface 310. However, the physical presence of the terminal ends of the uphole fibers 295, 395, as well as their close proximity to one another, substantially eliminate any interference of this variety.

The embodiments of FIGS. 2B-3B reveal particularly oriented and configured two channel fiber optic interfaces 310, 377 achieved between rotatable 295, 297 and stationary 395, 397 fibers. However, a variety of alternative configurations may be employed. For example, single channel fiber optics may be employed for two way communications over a single interface 310 without the use of another interface 377. By the same token, more than two interfaces 310, 377 may be stacked atop one another where more than two fiber optic channels are sought. Furthermore, with particular reference to 3A and 3B, there is no requirement that downhole transmissions take place over a larger encompassing interface 377 and uphole transmissions over a more discrete interface 310. Indeed, in one embodiment, downhole transmissions take place over the more discrete interface 310, whereas uphole transmissions take place over the larger interface 377. Additionally, a host of different lens configurations may be employed in directing the profile of the interfaces 310, 377. For example, in one alternate embodiment, terminal ends of the uphole fibers may be coupled to additional lenses to more tightly direct the interface 310. the joint 100 of FIG. 1 may be utilized between a stationary control unit 455 and rotatable drum 150. Surface equipment 450, including the noted unit 455 and drum 150, along with a mobile wireline truck 459 may be placed at the oilfield 401 adjacent a well head 460. As depicted, the oilfield 401 also accommodates a well 480 traversing various formation layers 490, 495, within which a logging application takes place.

The logging application proceeds by way of a logging tool 400 suspended from a wireline cable 180 or other suitable well access line. The wireline cable 180 traverses the well head 460 and is positionable in the well 480 by way of the rotatable drum 150 of FIG. 1. In spite of the moving and/or rotatable nature of the drum 150 and wireline cable 180, data and power transmissions between the movable wireline cable

180 and stationary control unit 455 are allowed. This is achieved through use of a data transmission assembly joint 100 as detailed in FIGS. 1-3B hereinabove, which is positioned between the wireline cable 180 and unit 455. Indeed, use of the joint 100 allows for data from the logging tool 400 to be obtained and processed by the control unit 455 in substantially real-time. For example, communication over the line 180 is limited only by the speed of the transmitted fiber optic light thereover. No stoppage of the logging application or other delays are required in order to obtain and process such data.

Figure 5:
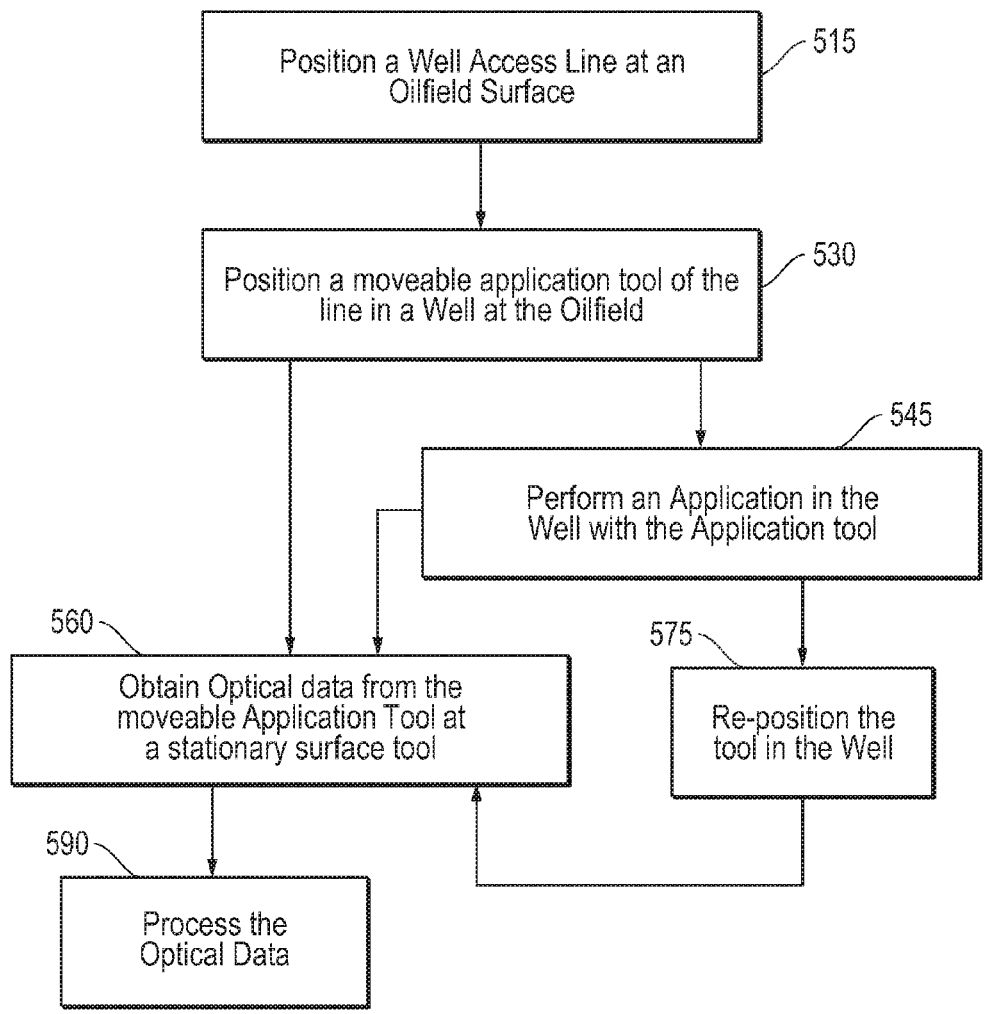
FIG. 5 is a flow-chart summarizing an embodiment of employing an optical data transmission assembly joint Embodiments are described with reference to certain tools and techniques for employing an optical data transmission assembly joint in an oilfield environment. In particular, embodiments of deploying a well access line in the form of a wireline cable or intervention cable are described. Additionally, oilfield logging applications are described in some detail. However, a variety of other non-logging oilfield applications and alternate deployment lines may be run in a manner which takes advantage of embodiments detailed herein. Regardless, embodiments described herein include such a joint that allows for effective real-time optical data transfer from a movable line to a stationary housing for processing. In fact, such data may even be attained over the joint via multiple optical channels, simultaneously.

Referring now to FIG. 5, a flow-chart summarizing an embodiment of employing an optical data transmission assembly joint is shown. As indicated at 515 and 530, a well access line may be placed at an oilfield with a movable application tool coupled thereto. The line may thus be positioned in the well for performing an application in the well with the tool (see 545). More significantly, however, optical data may be obtained from the tool as indicated at 560 in spite of the movable nature of the tool. That is, as detailed hereinabove, the optical data transmission assembly joint and the moving/rotatable fiber optic components of the well access line 180 in real-time during movement of the tool 400 while performing an application, such as, at 545. The application at 545 may comprise, but is not limited to, a logging application or operation (with a wireline cable or slickline cable), an intervention application or operation or the like, wherein measurements from the tool 400 are taken while the tool 400 is moving within the wellbore 480.

Due to the real-time nature of data transfer afforded by the noted joint, data acquired by surface equipment such as a control unit may be immediately processed as indicated at 590. Additionally, the application at 545 may proceed simultaneous with data acquisition at surface. In fact, data transfer may continue in real-time even as the tool is re-positioned as indicated at 575. In an embodiment, the tool may comprise the optical fiber itself, such as with distributed temperature sensing (DTS), distributed pressure sensing (DPS), and/or distributed vibration sensing (DVS), wherein the optical fiber is placed in the well 480 and may remain stationary during data acquisition.

Embodiments described hereinabove allow for the use of discrete fiber optic communications without reliance on conventional wireless technologies. Thus, practical and safe communication for the oilfield environment are made available. Further, embodiments of the transmission assembly joint which allow for fiber optic data transfer as detailed herein also allow for real-time data transmission in conjunction with well applications. Thus, embodiments described herein are able to take advantage of reduced line weight and profile while at the same time achieving real-time high-speed data transfer.

The preceding description has been presented with reference to presently preferred embodiments. Persons skilled in the art and technology to which these embodiments pertain will appreciate that alterations and changes in the described from the principle, and scope of these embodiments. For example, in addition to wireline cables described hereinabove, the well access line may be a fiber optic slickline as detailed in application Ser. No. 12/628,355 referenced hereinabove. Regardless, the foregoing description should not be read as pertaining only to the precise structures described and shown in the accompanying drawings, but rather should be read as consistent with and as support for the following claims, which are to have their fullest and fairest scope.

I claim:

1. An oilfield optical data transmission assembly joint, the joint comprising:
    a stationary housing having a stationary termination for receiving a stationary optical fiber;
    a rotatable coupling at least partially located in the stationary housing, wherein the rotatable coupling comprises:
        a channel having a central axis;
        a rotatable optical termination located in the channel, wherein the rotatable optical termination is configured to receive a rotatable optical fiber and interfacing the rotatable optical fiber with the stationary optical fiber to provide communication between the rotatable optical fiber and the stationary optical fiber;
        a chamber located on a side of the rotatable coupling offset from the central axis, wherein the chamber is configured to receive a cable bundle that includes the rotatable optical fiber and electrical lines, and wherein an electrical junction is located on the coupling and configured to receive the electrical lines; and
    a slip-ring interface between the stationary housing and the coupling for receiving electrical lines from the electrical junction, and enabling electrical communication, power communication, or combinations thereof between the stationary housing and the rotatable coupling.

2. The joint of claim 1, wherein the fibers are of a given diameter, the terminations within about a few times the given diameter of one another at the interfacing.

3. The joint of claim 1, wherein the interfacing of the terminations for the rotatable and stationary optical fibers provides two way fiber optic communication thereover.

4. The joint of claim 1, wherein the interfacing is an interior interfacing, the joint further comprising exterior interfacing with a termination of a second rotatable optical fiber of the rotatable coupling interfacing a termination of a second stationary optical fiber of the stationary housing, the interior interfacing disposed axially therebetween.

5. The joint of claim 4, wherein each of the interior and exterior interfacing is dedicated to single direction fiber optic transmission thereover.

6. The joint of claim 4, wherein the terminations of the second rotatable and stationary optical fibers are coupled to lens mechanisms for providing an optical channel profile to the exterior interfacing which exceeds that of an optical channel profile for the interior interfacing.

7. A method of employing an optical data transmission assembly joint at an oilfield, the method comprising:
    rotating an oilfield drum to deploy a well access line thereof into a well;
    running the well access line into a stationary housing and to a chamber located on a side of a rotatable coupling, wherein the rotatable coupling is at least partially located in the stationary housing;
    running optical fibers of the well access line from the chamber to a channel formed in the rotatable coupling, and aligning a termination thereof with a stationary optical fiber located in the stationary housing;
    running electrical lines of the well access line from the chamber to an electrical junction in communication with the stationary housing; and
    transmitting fiber optic data between the rotating coupling and a stationary housing of the joint and electrical communication, power, or combinations thereof between the rotatable coupling and the stationary housing.

8. The method of claim 7, wherein the transmitting further comprises transferring fiber optic data in one direction over a first fiber optic channel and in an opposite direction over a second fiber optic channel.

9. The method of claim 7, wherein the rotating and the transmitting occur simultaneously.

10. The method of claim 7, wherein the rotating positions the line at a first well location, the method further comprising repositioning the line in the well.

11. The method of claim 7 further comprising: processing of the optical data with equipment at a surface of the oilfield.

12. The method of claim 7 further comprising: performing an application in the well with a tool coupled to the line.

13. The method of claim 12, wherein the application is a logging application and wherein the performing, the transmitting, and the processing and rotating occur simultaneously.

14. The method of claim 12, wherein the application is an intervention application.

15. An oilfield assembly comprising:
a rotatable drum;
a well access line disposed about the drum; and
an optical data transmission assembly joint simultaneously coupled to the rotatable drum and stationary equipment for real-time processing of optical data from the line during rotation of the drum, wherein the optical data transmission joint comprises:
   a stationary housing having a stationary termination for receiving a stationary optical fiber;
   a rotatable coupling at least partially located in the stationary housing, wherein the rotatable coupling comprises:
      a channel having a central axis;
      a rotatable optical termination located in the channel, wherein the rotatable optical termination is configured to receive a rotatable optical fiber and interfacing the rotatable optical fiber with the stationary optical fiber to provide communication between the rotatable optical fiber and the stationary optical fiber;
      a chamber located on a side of the rotatable coupling offset from the central axis, wherein the chamber is configured to receive a cable bundle of the well access line that includes the rotatable optical fiber and electrical lines, and wherein an electrical junction is located on the coupling and configured to receive the electrical lines; and
      a slip-ring interface between the stationary housing and the coupling for receiving electrical lines from the electrical junction, and enabling electrical communication, power communication, or combinations thereof between the stationary housing and the rotatable coupling.

16. The assembly of claim 15, wherein the optical data for processing is acquired over a first fiber optic channel through the joint, other optical data from the equipment transmitted over a second fiber optic channel through the joint.

17. The assembly of claim 16, wherein the well access line is a wireline cable.

18. The assembly of claim 16, further comprising a logging tool coupled to the well access line.

* * * * *